US010755000B2

(12) United States Patent
Greve et al.

(10) Patent No.: US 10,755,000 B2
(45) Date of Patent: Aug. 25, 2020

(54) METHODS AND APPARATUSES FOR ASSESSING HIGH TEMPERATURE BONDING SYSTEMS AND BONDED SUBSTRATES THEREFROM

(71) Applicants: Toyota Motor Engineering & Manufacturing North America, Inc., Erlanger, KY (US); University of Maryland, College Park, College Park, MD (US)

(72) Inventors: Hannes Martin Hinrich Greve, Hyattsville, MD (US); F. Patrick McCluskey, Ellicott City, MD (US); Shailesh N. Joshi, Ann Arbor, MI (US)

(73) Assignees: Toyota Motor Engineering & Manufacturing North America, Inc., Plano, TX (US); University of Maryland, College Park, MD (US)

(*) Notice: Subject to any disclaimer, the term of this patent is extended or adjusted under 35 U.S.C. 154(b) by 963 days.

(21) Appl. No.: 15/344,530

(22) Filed: Nov. 6, 2016

(65) Prior Publication Data
US 2017/0132354 A1 May 11, 2017

Related U.S. Application Data

(60) Provisional application No. 62/252,158, filed on Nov. 6, 2015.

(51) Int. Cl.
*G06F 30/17* (2020.01)
*B22F 3/105* (2006.01)
(Continued)

(52) U.S. Cl.
CPC ............ *G06F 30/17* (2020.01); *B22F 3/1055* (2013.01); *B22F 3/1103* (2013.01); *B33Y 50/00* (2014.12);
(Continued)

(58) Field of Classification Search
None
See application file for complete search history.

(56) References Cited

U.S. PATENT DOCUMENTS 5,675,179 A 10/1997 Shu
6,879,925 B1 4/2005 Sasagawa
2009/0164183 A1 6/2009 Smith

OTHER PUBLICATIONS

Winter, P. R., & Wallach, E. R. (1997). Microstructural modelling and electronic interconnect reliability. Soldering & Surface Mount Technology, 9(2), 61-64. (Year: 1997).*

(Continued)

*Primary Examiner* — Bijan Mapar
(74) *Attorney, Agent, or Firm* — Dinsmore & Shohl LLP

(57) ABSTRACT

Methods and apparatuses for assessing the behavior of high temperature bonding systems such as sinter joint models of virtual interconnect microstructures via simulations that analyze sinter joint model properties include defining a plurality of sinter joint objects in a virtual interconnect microstructure, each sinter joint object having a type and a size, and determining a location of individual sinter joint objects with respect to one another in a virtual joint space to create a sinter joint model. The type is at least one of an intermetallic compound, a void, and a metal particle. The location is determined by, for each object, creating three-dimensional coordinates, and based on a determination that the sinter joint object is spaced from and non-overlapping with previously placed sinter joint objects, locking a position and size of the sinter joint object.

20 Claims, 3 Drawing Sheets

(51) Int. Cl.
*G06F 30/20* (2020.01)
*B33Y 50/00* (2015.01)
*C22C 1/04* (2006.01)
*B22F 3/11* (2006.01)
*C22C 1/08* (2006.01)
*B23K 103/12* (2006.01)
*G06F 119/08* (2020.01)
*G06F 119/18* (2020.01)

(52) U.S. Cl.
CPC .............. *C22C 1/0491* (2013.01); *C22C 1/08* (2013.01); *B22F 2301/10* (2013.01); *B22F 2301/15* (2013.01); *B22F 2998/10* (2013.01); *B23K 2103/12* (2018.08); *G06F 30/20* (2020.01); *G06F 2119/08* (2020.01); *G06F 2119/18* (2020.01); *Y02P 10/295* (2015.11)

(56) References Cited

OTHER PUBLICATIONS

Heng Juan Tang, Si Jie Chen, Numerical Simulation of TLP Bonding Process of 20 Steel Tubes, available at http://www.scientific.net/AMR.485.389, (Feb. 2012).

Rainer Dudek, Peter Sommer, Andreas Fix, Joerg Trodler, Sven Rzepka, Bernd Michel, Reliability Investigations for High Temperature Interconnects, available at http://www.emeraldinsight.com/doi/full/10.1108/SSMT-10-2013-0030, (Emerald Group Publishing Limited, Jan. 26, 2014).

* cited by examiner

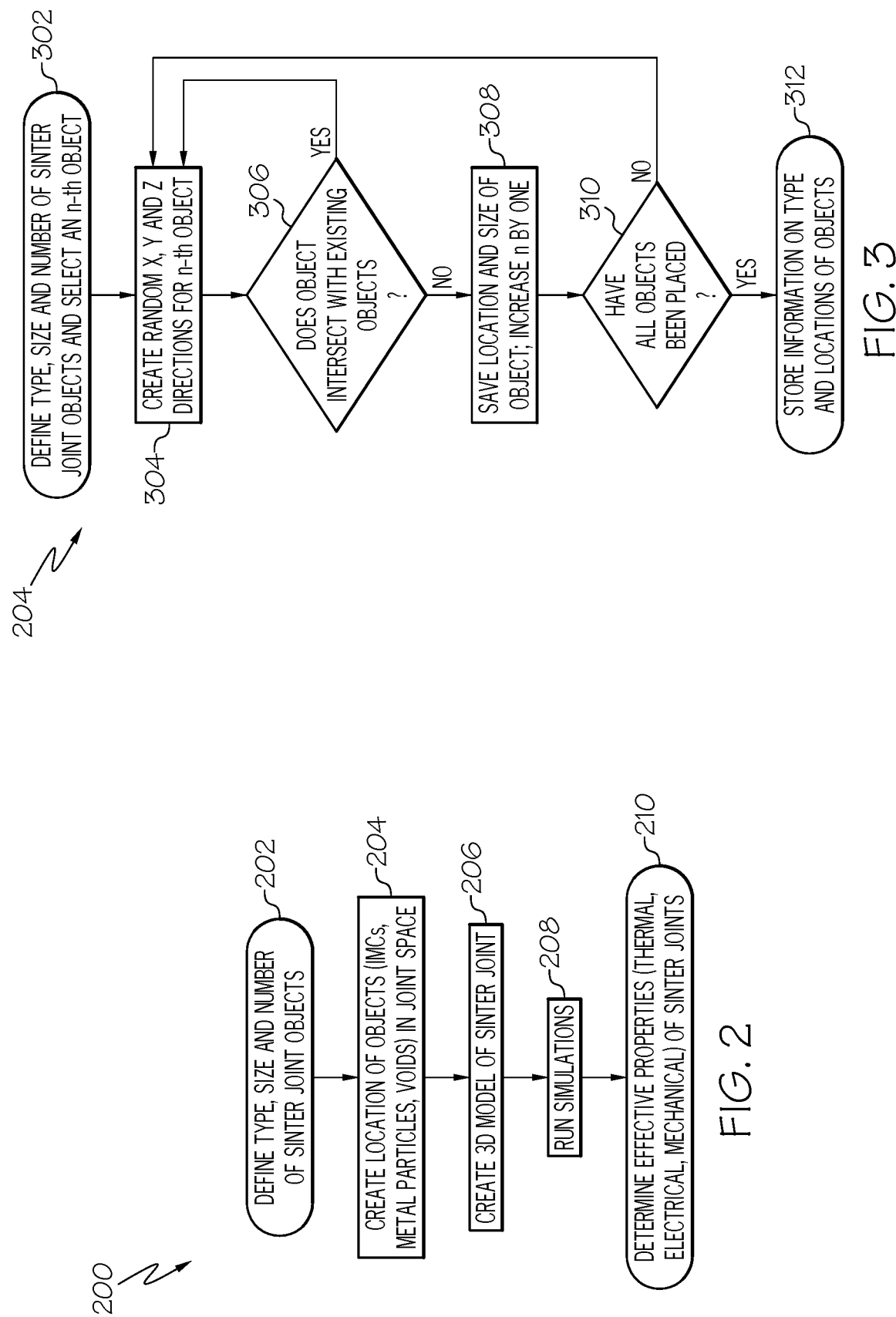

METHODS AND APPARATUSES FOR ASSESSING HIGH TEMPERATURE BONDING SYSTEMS AND BONDED SUBSTRATES THEREFROM

CROSS REFERENCE TO RELATED APPLICATIONS

The present specification claims priority to U.S. Provisional Patent Application Ser. No. 62/252,158, filed Nov. 6, 2015, and entitled METHODS AND APPARATUSES FOR ASSESSING HIGH TEMPERATURE BONDING SYSTEMS AND BONDED SUBSTRATES THEREFROM, the entirety of which is incorporated by reference herein.

TECHNICAL FIELD

The present specification generally relates to methods and apparatuses for assessing the behavior of high temperature bonding systems and substrates formed therefrom and, more specifically, to methods and apparatuses for assessing the behavior of high temperature bonding systems via simulations that analyze sinter joint object placements.

BACKGROUND

Power semiconductor devices, such as those fabricated from SiC (silicon carbide), may be designed to operate at very high operating temperatures (e.g., greater than 250° C.). Such power semiconductor devices may be bonded to a cooling device, such as a heat sink or a liquid cooling assembly, for example. The cooling device removes heat from the power semiconductor device to ensure that it operates at a temperature that is below its maximum operating temperature. The bonding layer that bonds the power semiconductor device to the cooling device must be able to withstand the high operating temperatures of the power semiconductor device.

Transient liquid phase ("TLP") sintering ("TLPS"), or diffusion bonding, or soldering are methods of high temperature bonding that may be used to bond one substrate to another (e.g., a power semiconductor to a cooling device). For example, TLP bonding results in a bond layer having a high temperature melting point. A typical TLP bond consists of two different material compounds: a metallic layer and an intermetallic layer or alloy. Generally, the intermetallic layer having a high-remelting temperature is formed during an initial melting phase wherein a low melting temperature material, such as tin, diffuses into high melting temperature materials, such as copper, silver, or nickel. Conventional methods for assessing TLP sintered interconnect microstructures have utilized homogeneous virtual models, while such microstructures are generally heterogeneous in reality. However, computational power restrictions have prevented the use of heterogeneous virtual models, which would provide for a more accurate simulation of a formed real world bond and its associated mechanical, thermal, and electrical properties.

Accordingly, a need exists for alternative methods for assessing a strengthened bonding layer between a pair of substrates and formed from a high temperature bonding, such as virtual models utilizing heterogeneous models of a final sintered interconnect microstructure that do not require excessive computational power to operate.

SUMMARY

In one embodiment, a method for assessing an interconnect microstructure of a virtual assembly of a high temperature bonding of substrates includes a plurality of sinter joint objects in the interconnect microstructure of the virtual assembly, each sinter joint object of the plurality of sinter joint objects having a type and a size, and determining, by the processor, a location of individual sinter joint objects of the plurality of sinter joint objects with respect to one another in a virtual joint space to create a sinter joint model. The type is at least one of an intermetallic compound, a void, and a metal particle. The location is determined by, for each individual sinter joint object, creating three-dimensional coordinates for the sinter joint object, and based on a determination that the sinter joint object is spaced from and non-overlapping with previously placed sinter joint objects, locking a position and size of the sinter joint object in the virtual joint space.

In another embodiment, a system for assessing an interconnect microstructure of a virtual assembly of a high temperature bonding of substrates includes a processor, and a non-transitory computer-readable storage medium in communication with the processor, the non-transitory computer-readable storage medium including one or more programming instructions executable by the processor to cause the processor to define a plurality of sinter joint objects in the interconnect microstructure of the virtual assembly, each sinter joint object of the plurality of sinter joint objects having a type and a size, and determine a location of individual sinter joint objects of the plurality of sinter joint objects with respect to one another in a virtual joint space to create a sinter joint model. The type is at least one of an intermetallic compound, a void, and a metal particle. The location is determined by, for each individual sinter joint object, one or more further programming instructions executable by the processor to cause the processor to: create three-dimensional coordinates for the sinter joint object, and based on a determination that the sinter joint object is spaced from and non-overlapping with previously placed sinter joint objects, lock a position and size of the sinter joint object in the virtual joint space.

In another embodiment, a method for assessing an interconnect microstructure of a virtual assembly of a bonding of substrates includes defining, by a processor, a plurality of sinter joint objects in the interconnect microstructure of the virtual assembly, each sinter joint object of the plurality of sinter joint objects having a type and a size, determining, by the processor, a location of individual sinter joint objects of the plurality of sinter joint objects with respect to one another in a virtual joint space to create a sinter joint model, creating, by the processor, a three-dimensional model of the sinter joint model, determining one or more simulated properties of the sinter joint model, and displaying at least one of the one or more simulated properties and the three-dimensional model of the sinter joint model on a graphical user interface communicatively coupled to the processor. The type is at least one of an intermetallic compound, a void, and a metal particle. The location is determined by, for each individual sinter joint object, creating three-dimensional coordinates for the sinter joint object, and based on a determination that the sinter joint object is spaced from and non-overlapping with previously placed sinter joint objects, locking a position and size of the sinter joint object in the virtual joint space.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2 schematically depicts a flow chart setting forth an example method of assessing transient liquid phase sintering ("TLPS") sinter joints, according to one or more embodiments shown and described herein;

FIG. 3 schematically depicts a flow chart setting forth an example method of determining a location of a sintered object in a TLPS sinter joint to be assessed, according to one or more embodiments shown and described herein.

DETAILED DESCRIPTION

Figure 1A:
FIG. 1A schematically depicts an example first bonding assembly prior to forming a bond layer between a pair of substrates via a high-temperature heating application, according to one or more embodiments shown and described herein.

Referring generally to the figures, embodiments of the present disclosure are directed to methods and apparatuses for assessing properties of an interconnect microstructure of a virtual assembly of a high temperature bonding of substrates. For example, substrates, such as silicon or wideband gap semiconductor devices, may be attached to metallic or ceramic substrate for power electronic applications requiring operation at high temperatures via the use of transient liquid phase sintering ("TLPS"). Through TLPS in real-world operations, pastes and/or powders include sinter joint objects including at least micro-sized material such as metal particles of a low melting point material (such as tin (Sn)) and a high melting point material (such as silver (Ag), copper (Cu), and/or nickel (Ni)) having a greater melting point than the low melting point material. The micro-sized material may be embedded in an organic binder that is disposed and sintered between such substrates to form connecting joints or interconnect microstructures (alternatively referable to as interconnects) therebetween. Sinter joint object types of a formed interconnect microstructure may include metal particles of the high melting point material, voids and intermetallic compounds ("IMCs") as formed between the low and high melting point materials during TLPS, as described in greater detail below. The embodiments described herein include providing a virtual model of an interconnect microstructure of a virtual assembly and analyzing the virtual model via one or more simulations to determine properties of the virtual model, as described in greater detail below.

In particular, the embodiments described herein perform assessments that assist in determining how to modify microstructures of TLPS joints, or interconnect microstructures, to enhance the mechanical, thermal, and electrical performance of electronic systems and to maximize system reliability through modification of, for example, mechanical properties. Further, while a conventional assessment approach has considered the TLPS bond to be homogenous without voids, such a model is generally unrealistic and provides an inaccurate assessment to describe the thermal, electrical, and mechanical behavior of TLPS interconnect microstructures. Rather, TLPS interconnects are characterized by highly complex microstructures that include intermetallic compounds as matrix material and have metal particles embedded in that matrix. Thus, size, shape, and distribution of metallic and intermetallic regions may be highly heterogeneous. The methods described herein are directed toward creating and utilizing heterogeneous computational models that are capable of assessing the behavior of TLPS interconnects with sinter joint objects such as inclusions and voids of potential different geometries.

Embodiments described herein provide for the advantages of creating a stronger bond layer due to the use of simulated heterogeneous joint models over a conventional homogeneous joint model of a joint formed from a high temperature bonding of substrates as created in a virtual environment. For example, finite element simulation ("FES") technologies numerically analyze simulated models to mimic microstructure formations and analyze resulting properties such as mechanical properties directed to stress-strain curves and thermal conductivity of the analyzed microstructures.

Various embodiments of methods for assessing high temperature bonding of systems (such as virtual interconnect microstructure models to assess properties of the virtual models) and substrates formed therefrom are described in detail herein. Although example methods for assessing interconnect microstructures formed from high temperature bonding of substrates are described in the context of power electronics applications (e.g., to bond a power semiconductor device to a cooling assembly in an inverter circuit of hybrid or electric vehicles), the use of methods described herein is not limited thereto. For example, example methods and substrates formed therefrom that are described herein may be implemented in other semiconductor use applications and other applications to analyze the interconnect microstructure formed from a bonding of at least two components together.

FIG. 1A illustrates a schematic illustration of an example real-world pre-bonding assembly 100 assembled and prepared for a high temperature bonding of substrates, such as a TLPS bonding, for example. Referring to FIG. 1A, a first substrate 102 and a second substrate 104 is provided. The first substrate 102 includes a die that is made of Si (silicon), SiC (silicon carbide), or the like. The second substrate 104 may include direct bonded copper, direct bonded aluminum, or the like. It should be understood that other substrate materials suitable for a high temperature bonding application are within the scope of this disclosure.

As shown in FIG. 1A, a material 106 is positioned between the first substrate 102 and the second substrate 104 to form the pre-bonding assembly 100. As a non-limiting example, the material 106 may be a paste and/or a powder including sinter joint objects. For example, the paste may include at least an amount of a plurality of high melting point material such as a plurality of high melting point material and/or a low melting point material such as an amount of tin. The low melting point material has a lower melting point than the high melting point material.

Figure 1B:
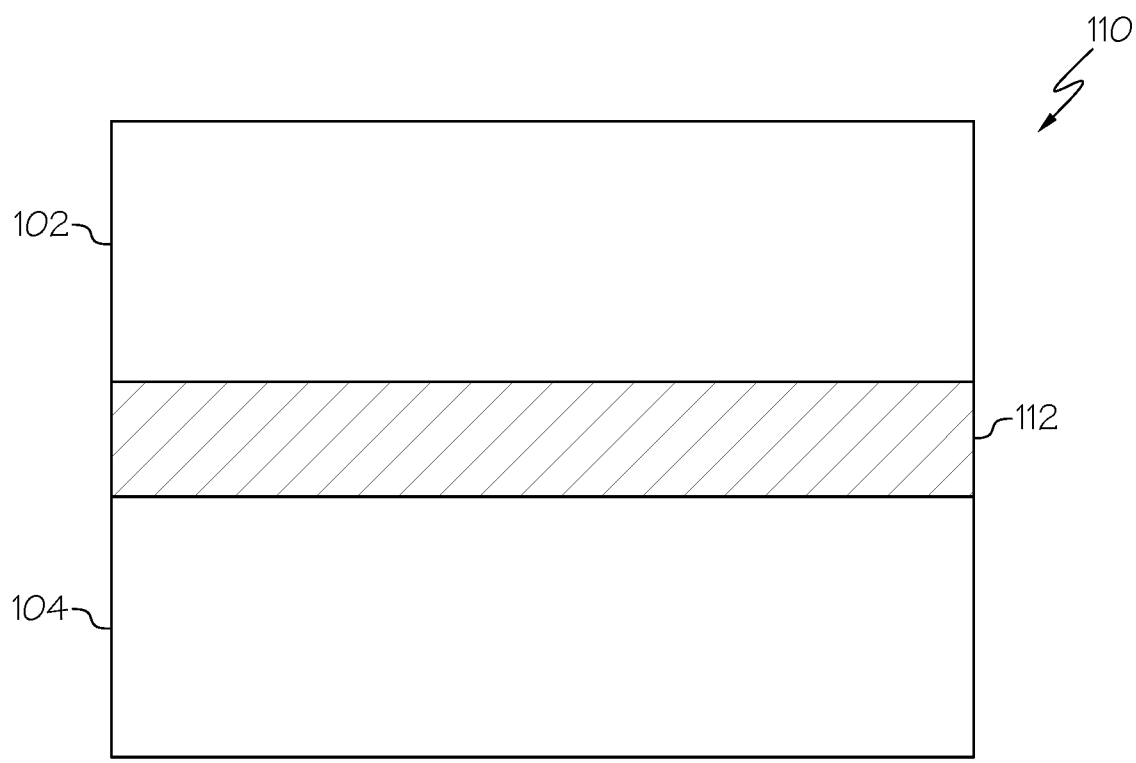
FIG. 1B schematically depicts the example first bonding assembly of FIG. 1A after undergoing the high-temperature heating application, in which the first bonding assembly has a formed bond layer between the pair of substrates, according to one or more embodiments shown and described herein.

Referring to FIG. 1B, upon a high temperature heating, the paste as the material 106 holding an amount of tin and high melting point material forms intermetallic compounds and a bond layer 112 of a bonded assembly 110, which high temperature heating methods may include conventional high temperature bonding processes as are within the scope of this disclosure. For example, the high temperature heating may be part of a TLPS heating or soldering or a diffusion soldering process as conventionally known.

The amount of tin and the amount of high melting point materials disposed as sinter joint objects to form the bond layer 112 may depend on the desired application and properties for the resulting bond layer. As a non-limiting example, the amount of tin include a weight percent of 70% tin, and the amount of the plurality of high melting point materials may include a weight percent of 30%. The plurality of high melting point materials may be nickel (Ni), copper (Cu), aluminum (Al), silver (Ag), or like metal materials, such as metal magnetic materials, alone or in combinations thereof. In embodiments, the plurality of high melting point materials may comprise at least about 30 wt % Cu, at least about 30 wt % Ni, at least about 30 wt % Ag, at least 30 wt % Al, and/or a 30 wt % mixture of Ni, Cu, Al, and/or Ag. In other embodiments, the high melting point material of the metal particles (e.g., Ni, Cu, Al, Ag, other suitable like metal materials, or any combination thereof) includes a weight percent of in the range of about 20% to about 40%, and the tin comprises a respective weight percent in the range of about 80% to about 60%. In embodiments, the high melting point material of the metal particles may comprise Ni, Cu, Al, and/or Ag and be in a range of at least about 20 wt % to at least about 40 wt %. For example, the amount of tin may include a weight percent of 60% tin, and the amount of the plurality of high melting point materials may include a weight percent of 40% Ni. Or the amount of tin may include a weight percent of 60% tin, and the amount of the plurality of high melting point materials may include a weight percent of 40% Cu. Or the amount of tin may include a weight percent of 80% tin, and the amount of the plurality of high melting point materials may include a weight percent of 20% Ag.

Referring to FIG. 2, an example of a method 200 for virtually assessing interconnect microstructures formed from high temperature bonding of substrates includes creating a computer model of a plurality of sinter joint objects. As another non-limiting example, the method 200 may be applied to virtual interconnect models formed from other types of bonding of substrates rather than a high temperature bonding as described herein.

In block 202, a type, number, and size of each of the plurality of sinter joint objects are defined to create a number of defined sinter joint objects. The type may be at least one of inclusions, such as intermetallic compounds, voids, and metal particles. For example, the number of defined sinter joint objects may include at least a plurality of voids of varying or identical diameters or radiuses or may be absent of voids. The metal particles may be in a range of from about 20 μm to about 40 μm in radius. The voids may be about 30 μm in radius. Additionally or alternatively, the intermetallic compounds may be $Cu_6Sn_5$, $Cu_3Sn$, $Ni_3Sn_4$, or other suitable alloys formed from the metal particles disposed between substrates in a high temperature bonding. In non-limiting examples, the metal particles may be Ni and may be 20% of the total number of defined sinter joint objects. Or each metal particle may be selected from at least one of a group consisting of Ni, Cu, Ag, and Al, having the respective properties of each selected metal, and the metal particles may be 20% of the total number of defined sinter joint objects. As a non-limiting example, the metal particles may be 20% of the total number of the defined sinter joint objects, the voids may be in a range of from about 0% to 10% of the total number of the defined sinter joint objects, and the intermetallic compounds may be the remaining percentage of the total number of the defined sinter joint objects. In embodiments, at least two of the number of defined sinter joint objects having a same type may be different in size.

In block 204, a location of the defined types, numbers, and sizes of the number of defined sinter joint objects with respect to one another is created in a virtual joint space to create a sinter joint model. For example, referring to block 302 of FIG. 3, an n-th object is selected from the number of defined sinter joint objects to begin to define the type, size, and number of sinter joint objects. Next, in block 304, three-dimensional coordinates for the n-th object are created as, for example, random x, y, and z directions. In block 306, the method evaluates whether the n-th object intersects with existing objects. If the answer is yes, the method returns to block 304 to reposition the n-th object so that sinter joint objects do not overlap in the model. If the answer is no, such that the currently analyzed sinter joint objects do not overlap, the method continues onto block 308. For example, based on a determination that the n-th object is spaced from and non-overlapping with existing ones of the number of defined sinter joint objects, the n-th object position and size in the virtual joint space is saved and locked, and the n-th object is increased by a value of one to analyze the next n-th plus one object.

In block 310, the method analyzes if all objects have been placed. If the answer is no, such that there are remaining objects to be analyzed, the steps of blocks 304-310 are repeated until all of the number of defined sinter joint objects have been placed. If the answer is yes, such that all the objects have been analyzed, the method proceeds to block 312. In block 312, the information on type and location of each object of the plurality of sinter joint objects is saved and stored in, for example, a database or other suitable data storage structure as is within the scope of this disclosure. The method as presented in FIG. 3 thus depicts an exemplary algorithm to locate objects in a modeled TLPS joint space in a manner to prevent overlapping of such objects (that may be, for example, IMCs, metal particles, and/or voids) within the modeled space.

Referring once again to FIG. 2, once the location of objects are created in the model space in block 204 (as described in more depth above with respect to FIG. 3), the process proceeds to block 206 of FIG. 2. In block 206, a three-dimensional model of the sinter joint model, or rather sinter joint within the modeled space, is created. Such a three-dimensional model may be displayable and usable in simulation environments to assess the thermal, electrical, and mechanical properties of TLPS sinter joints. For example, in block 208, one or more simulations are run of the three-dimensional model of the sinter joint model.

In block 210, properties of the sinter joint model based on the run simulations are determined. For example, such properties may include coefficient of thermal expansion ("CTE") values, stress and strain values of the metal particles (and/or the pair of substrates if analyzed in the virtual model), and/or stress values of the intermetallic compounds. As a non-limiting example, a run simulation may result in a finding that a specific model includes no voids, which may show a result of a strengthened bond layer over another model including voids. For example, the model with no voids may have increased (i.e., greater) intermetallic compound and first substrate stress levels (in MPa, for example) over the model having voids. Further, such a run simulation may show that intermetallic compound principal stresses are not equally reduced around metal particles and voids, and may instead have a consideration reduction of principal stress in areas with voids rather than in areas with metal particles.

Figure 4:
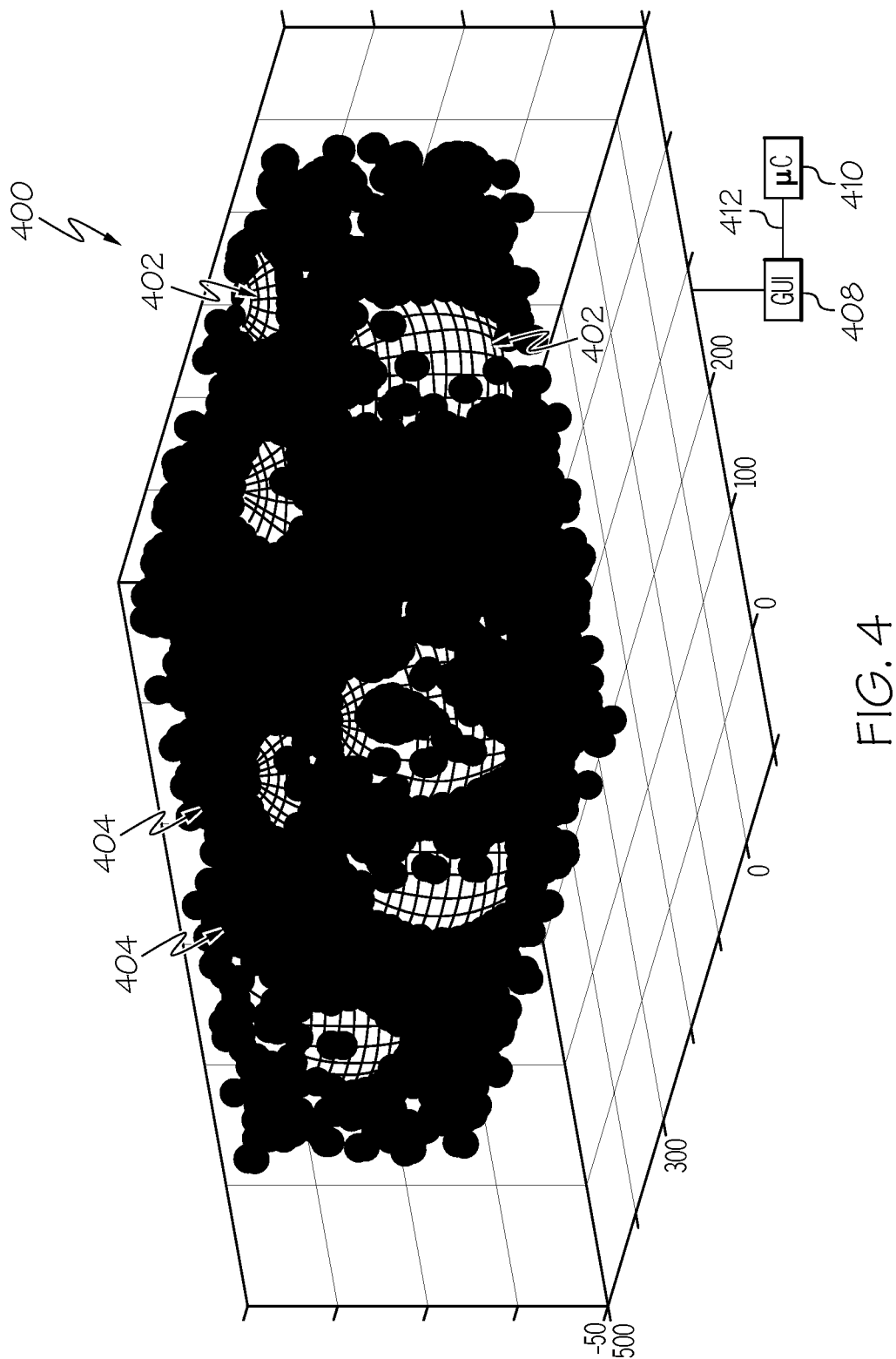
FIG. 4 schematically depicts 3D simulated view of an example modeled sintered joint created through the methods of FIGS. 2-3, according to one or more embodiments shown and described herein.

Referring to FIG. 4, a depiction of a three-dimensional model of a sinter joint model 400 as created by the embodiments described herein is shown. For example, the sinter joint model 400 includes one or more voids 402 and one or more metal particles 404 in a three-dimensional coordinate space. In embodiments, a system for assessing the virtual interconnect microstructures may include a graphical user interface (GUI) 408 that is communicatively coupled to a microcontroller 410 via a communication path 412. The three-dimensional model of the sinter joint model 400 and/or the properties resulting from the run simulations may be shown on a display of the GUI 408, such as a screen, that is accessible at a user workstation such as an a computer.

The workstation may be associated with at least a server, a database, a wide area network (WAN) such as an intranet or the Internet, or local area network (LAN), and input/output hardware and/or software to send and receive data. Exemplary input/output hardware includes but is not limited to universal serial bus (USB), FireWire, Thunderbolt, LAN port, wireless fidelity (Wi-Fi) card, WiMax card, and/or other hardware for communication with other networks and/or external devices. System components may be communicatively coupled via communication paths 412 to the system (through wires or wirelessly). The microcontroller 410 may including a processor and a non-transitory computer-readable storage medium, such as memory, that is in communication with the processor. The non-transitory computer-readable storage medium may include one or more programming instructions executable by the processor to cause the processor to enact steps such as those described above and herein with respect to FIGS. 2-3.

It should now be understood that embodiments described herein are directed to methods for assessing virtual interconnect microstructures as formed from a high temperature bonding of substrates to develop a strengthened bonding or bond layer between two bonded substrates or a plurality of substrates. Described herein are embodiments to assess the behavior of TLPS systems and their joints that are characterized by highly complex microstructures. The embodiments may include a simulation that is performed along with an algorithm that creates material type, position, and size of sinter joint objects in a virtual sinter joint model. The objects may be modeled as inclusions and/or voids and follow an algorithm to be non-overlapping in the joint space and that may be heterogeneous with respect to one another. The embodiments may generate three-dimensional models that are assessed in simulation environments to provide thermal, electrical, and mechanical properties of the modeled TLPS sinter joints. The example methods described herein may be used to determine a TLPS sinter joint microstructure that results in a strengthened bond layer between at least a pair of substrates, which may be used to bond semiconductor devices in power electronics applications, for example.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for assessing an interconnect microstructure of a virtual assembly of a high temperature bonding of substrates, the method comprising:
defining, by a processor, a plurality of sinter joint objects in the interconnect microstructure of the virtual assembly, each sinter joint object of the plurality of sinter joint objects having a type and a size, wherein the type is at least one of an intermetallic compound, a void, and a metal particle; and
determining, by the processor, a location of individual sinter joint objects of the plurality of sinter joint objects with respect to one another in a virtual joint space to create a sinter joint model, wherein the location is determined by, for each individual sinter joint object:
creating three-dimensional coordinates for the sinter joint object; and
based on a determination that the sinter joint object is spaced from and non-overlapping with previously placed sinter joint objects, locking a position and size of the sinter joint object in the virtual joint space.

2. The method of claim 1, further comprising:
creating, by the processor, a three-dimensional model of the sinter joint model;
determining, by the processor, at least one of mechanical, thermal, and electrical properties of the sinter joint model; and
storing information regarding the type, size, and coordinates of each object of the plurality of sinter joint objects following one or more simulations.

3. The method of claim 2, wherein the high temperature bonding comprises at least one of a transient liquid phase sintering heating process and a diffusion soldering process.

4. The method of claim 2, wherein the intermetallic compound comprises one of $Cu_6Sn_5$, $Cu_3Sn$, and $Ni_3Sn_4$.

5. The method of claim 1, wherein each void has a radius of 30 μm and each metal particle has a radius in a range of from about 20 μm to about 40 μm.

6. The method of claim 1, wherein the plurality of sinter joint objects comprises at least a plurality of voids.

7. The method of claim 1, wherein the plurality of sinter joint objects does not include one or more voids.

8. The method of claim 1, wherein a plurality of metal particles comprise 20% of the plurality of sinter joint objects in the sinter joint model.

9. The method of claim 1, wherein each metal particle is selected from at least one of a group consisting of Ni, Cu, Ag, and Al.

10. The method of claim 9, wherein the metal particles comprise 20% of the plurality of sinter joint objects in the sinter joint model, a plurality of voids of the plurality of sinter joint objects comprises a range of from about 0% to about 10% of the plurality of sinter joint objects in the sinter joint model, and a plurality of intermetallic compounds of the plurality of sinter joint objects comprises a remaining percentage of the plurality of sinter joint objects in the sinter joint model.

11. The method of claim 1, wherein:
at least two of the plurality of sinter joint objects of a same type have different sizes.

12. A system for assessing an interconnect microstructure of a virtual assembly of a high temperature bonding of substrates, the system comprising:
- a processor;
- a non-transitory computer-readable storage medium in communication with the processor, the non-transitory computer-readable storage medium including one or more programming instructions executable by the processor to cause the processor to:
  - define a plurality of sinter joint objects in the interconnect microstructure of the virtual assembly, each sinter joint object of the plurality of sinter joint objects having a type and a size, wherein the type is at least one of an intermetallic compound, a void, and a metal particle; and
  - determine a location of individual sinter joint objects of the plurality of sinter joint objects with respect to one another in a virtual joint space to create a sinter joint model, wherein the location is determined by, for each individual sinter joint object, one or more further programming instructions executable by the processor to cause the processor to:
  - create three-dimensional coordinates for the sinter joint object; and
  - based on a determination that the sinter joint object is spaced from and non-overlapping with previously placed sinter joint objects, lock a position and size of the sinter joint object in the virtual joint space.

13. The system of claim 12, further comprising one or more instructions executable by the processor to cause the processor to:
- create a three-dimensional model of the sinter joint model;
- determine at least one of mechanical, thermal, and electrical properties of the sinter joint model; and
- store information regarding the type, size, and coordinates of each object of the plurality of sinter joint objects following one or more simulations.

14. The system of claim 13, wherein the plurality of sinter joint objects comprises at least a plurality of voids comprising no more than 10% of the plurality of sinter joint objects in the sinter joint model.

15. The system of claim 13, wherein the plurality of sinter joint objects does not include one or more voids.

16. The system of claim 13, wherein a plurality of metal particles comprise 20% of the plurality of sinter joint objects in the sinter joint model.

17. The system of claim 12, wherein each metal particle is selected from at least one of a group consisting of Ni, Cu, Ag, and Al.

18. The system of claim 17, wherein a plurality of metal particles comprise 20% of the plurality of sinter joint objects in the sinter joint model, a plurality of voids of the plurality of sinter joint objects comprises a range of from about 0% to about 10% of the plurality of sinter joint objects in the sinter joint model, and a plurality of intermetallic compounds of the plurality of sinter joint objects comprises a remaining percentage of the plurality of sinter joint objects in the sinter joint model.

19. A method for assessing an interconnect microstructure of a virtual assembly of a bonding of substrates, the method comprising:
- defining, by a processor, a plurality of sinter joint objects in the interconnect microstructure of the virtual assembly, each sinter joint object of the plurality of sinter joint objects having a type and a size, wherein the type is at least one of an intermetallic compound, a void, and a metal particle;
- determining, by the processor, a location of individual sinter joint objects of the plurality of sinter joint objects with respect to one another in a virtual joint space to create a sinter joint model, wherein the location is determined by, for each individual sinter joint object:
  - creating three-dimensional coordinates for the sinter joint object; and
  - based on a determination that the sinter joint object is spaced from and non-overlapping with previously placed sinter joint objects, locking a position and size of the sinter joint object in the virtual joint space;
- creating, by the processor, a three-dimensional model of the sinter joint model;
- determining one or more simulated properties of the sinter joint model; and
- displaying at least one of the one or more simulated properties and the three-dimensional model of the sinter joint model on a graphical user interface communicatively coupled to the processor.

20. The method of claim 19, further comprising:
storing information regarding the type, size, and coordinates of each object of the plurality of sinter joint objects following the one or more simulations.

* * * * *